(12) United States Patent
Munshi et al.

(10) Patent No.: US 10,081,687 B2
(45) Date of Patent: Sep. 25, 2018

(54) PROCESS FOR CHLORINATION OF A POLYMER

(71) Applicant: RELIANCE INDUSTRIES LIMITED, Mumbai, Maharashtra (IN)

(72) Inventors: Pradip Munshi, Gujarat (IN); Ninad Deepak Ingle, Maharashtra (IN); Pradeep Paresh Kapadia, Maharashtra (IN); Raksh Vir Jasra, Gujarat (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 0 days.

(21) Appl. No.: 15/221,038

(22) Filed: Jul. 27, 2016

(65) Prior Publication Data

US 2017/0029536 A1    Feb. 2, 2017

(30) Foreign Application Priority Data

Jul. 29, 2015  (IN) .......................... 2863/MUM/2015

(51) Int. Cl.
  *C08F 8/22*   (2006.01)
  *B01J 19/00*  (2006.01)
  *B01J 19/12*  (2006.01)

(52) U.S. Cl.
  CPC ............ *C08F 8/22* (2013.01); *B01J 19/0013* (2013.01); *B01J 19/12* (2013.01)

(58) Field of Classification Search
  CPC ................................ C08F 8/22; C08F 114/06
  See application file for complete search history.

(56) References Cited

U.S. PATENT DOCUMENTS

| | | | | |
|---|---|---|---|---|
| 4,049,517 A | * | 9/1977 | Adachi | .................... C08F 8/22 522/132 |
| 4,412,898 A | * | 11/1983 | Olson | ....................... C08F 8/22 522/132 |
| 5,216,088 A | * | 6/1993 | Cinadr | ...................... C08F 8/22 525/331.6 |
| 5,340,880 A | | 8/1994 | Backman et al. | |
| 6,187,868 B1 | | 2/2001 | Backman et al. | |

FOREIGN PATENT DOCUMENTS

| | | |
|---|---|---|
| CN | 103554313 A | 5/2014 |
| WO | 2016/075567 A1 | 5/2016 |

OTHER PUBLICATIONS https://en.wikipedia.org/wiki/Softening_point; 2015.*

* cited by examiner

*Primary Examiner* — Roberto Rabago
(74) *Attorney, Agent, or Firm* — Collard & Roe, P.C.

(57) ABSTRACT

The present disclosure relates to a process for chlorination of a polymer. The process of the present disclosure includes minimum use of light and maximum chlorine utilization for getting maximum chlorination yield. The chlorinated polymer obtained by the process of the present disclosure exhibit improved properties viz. thermal stability, color, inherent viscosity and mechanical properties.

6 Claims, No Drawings

PROCESS FOR CHLORINATION OF A POLYMER

CROSS REFERENCE TO RELATED APPLICATIONS

Applicant claims priority under 35 U.S.C. § 119 of Indian Application No. 2863/MUM/2015 filed on Jul. 29, 2015, the disclosure of which is incorporated by reference.

FIELD

The present disclosure relates to a process for chlorination of a polymer.

BACKGROUND

Chlorination is known to improve the properties of certain resinous polymers, notably polyvinyl chloride, polyethylene, polypropylene and natural rubber.

Chlorinated polymers, e.g., chlorinated products of natural rubber, polyisoprene, polyethylene and polypropylene, are used as binders, e.g., for paints, adhesives and printing inks. Chlorinated polymers are usually prepared using gaseous chlorine or chlorinated hydrocarbons, such as carbon tetrachloride, trichloroethylene, chloroform or tetrachloroethane as solvents.

The chlorination of polyvinyl chloride (PVC) particles in an aqueous medium, using chlorine gas, is a three phase (Gas-Liquid-Solid) system. The surface chlorination of PVC particles occurs in the first phase, but the chlorination inside the pores of the PVC particles is also desirable for high chlorination yield as well as the uniformity in chlorination. Thus the diffusion of chlorine inside the pores of the polymer and penetration of radiation or light is essential. Though diffusion of chlorine gas occurs inside the pores, the penetration of light inside the pores is poor. The poor penetration of light inside the pores of PVC obstructs the formation of chlorine radicals. When the chlorine radicals are formed in the solution external to the particles, due to short life time the radical recombines with another radical by the time it diffuses inside the pores of the polymer.

Further, long exposure of radiation can degrade the polymer chain and thus it is recommended to have less exposure of radiation onto the polymer.

There is, therefore, felt a need to develop a process for the chlorination of polymers that obviates the drawbacks of the prior art.

OBJECTS

Some of the objects of the present disclosure, which at least one embodiment herein satisfies, are as follows:

An object of the present disclosure is to provide a process for chlorination of a polymer.

Another object of the present disclosure is to provide a synergistic combination of thermal and photo-irradiation for chlorination of the polymer.

Still another object of the present disclosure is to provide a process for the polymerization that exposes the polymer to be chlorinated to minimum radiation.

Other objects and advantages of the present disclosure will be more apparent from the following description, which is not intended to limit the scope of the present disclosure.

SUMMARY

The present disclosure envisages a process for chlorination of a polymer in an aqueous solution, the process comprises charging a reaction closed vessel with polymer powder and water to obtain a suspension. Chlorine gas is introduced into the closed vessel containing the suspension till a predetermined pressure is attained to obtain a reaction mixture. The reaction mixture is stirred to obtain a slurry. The chlorine molecules present in the closed vessel are dissociated into chlorine radicals in two stages: i) dissociating a first portion of the chlorine molecules by irradiating the slurry with radiation having a predetermined intensity and wavelength at a first predetermined temperature and predetermined pressure; and ii) further dissociating a second portion of the chlorine molecules, by gradually increasing the temperature of the slurry from the first predetermined temperature to a second predetermined temperature, thereby thermally dissociating the chlorine molecules, into chlorine radicals, while gradually reducing the intensity of the radiation to zero. The dissociated chlorine radicals are allowed to react with the polymer to obtain a mixture comprising the chlorinated polymer. The chlorinated polymer is recovered from the mixture.

The process of the present disclosure is carried out in the absence of a swelling agent, a dispersing agent and an initiator.

The polymer is at least one selected from the group consisting of polyvinyl chloride, polybutadiene rubber, neodymium butadiene rubber, polypropylene, polyethylene terephthalate and polyethylene. The predetermined pressure is in the range of 0.5 to 2 bar. The first predetermined temperature is less than the softening temperature of the polymer. The second predetermined temperature is above the softening temperature of the polymer. The wavelength of the radiation is in the range of 250 to 550 nm and the intensity of the radiation is in the range of 3 watt/Kg PVC to 10 watt/Kg PVC.

The steps of gradually increasing the temperature and gradually reducing the intensity of radiation are carried out over a time period in the range of 1 hour to 8 hours.

The chlorinated polymer obtained by the process of the present disclosure is characterized by inherent viscosity in the range of 0.1 to 0.2 dL/g, the intrinsic viscosity in the range of 0.8 to 0.82 dL/g.

DETAILED DESCRIPTION

Chlorination is known to improve the properties of certain resinous polymers, notably polyvinyl chloride, polyethylene, polypropylene and natural rubber. Chlorinated polymers can be used as binders, e.g., for paints, adhesives and printing inks. Chlorinated polymers are usually prepared using gaseous chlorine or chlorinated hydrocarbons, such as carbon tetrachloride, trichloroethylene, chloroform or tetrachloroethane as solvents.

The present disclosure relates to a process for chlorination of a polymer. The process of the present disclosure is carried out in the absence of swelling agents, dispersing agents or initiators. The process for chlorination of the present disclosure uses a synergistic combination of thermal energy and radiation to minimize the exposure of radiation onto the polymer.

In accordance with one aspect of the present disclosure, there is provided a process for chlorination of a polymer in an aqueous solution in the absence of a swelling agent, a dispersing agent and an initiator. The process comprises the steps, which are described herein below.

Initially a closed vessel is charged with polymer powder and water to obtain a suspension.

In the next step, chlorine gas is introduced into the closed vessel, which contain suspension till a predetermined pressure is attained to obtain a reaction mixture.

The so obtained reaction mixture is stirred to obtain a slurry.

The chlorine molecules present in the closed vessel are dissociated into chlorine radicals in two stages:
dissociating a first portion of the chlorine molecules by irradiating the slurry with radiation having a predetermined intensity and wavelength at a first predetermined temperature and predetermined pressure;
further dissociating a second portion of the chlorine molecules, by gradually increasing the temperature of the slurry from the first predetermined temperature to a second predetermined temperature, thereby thermally dissociating the chlorine molecules, into chlorine radicals, while gradually reducing the intensity of the radiation to zero;

Next, the dissociated chlorine radicals are allowed to react with the polymer to obtain a mixture comprising the chlorinated polymer, which is followed by recovering the chlorinated polymer.

In accordance with the embodiments of the present disclosure, the polymer is at least one selected from the group consisting of polyvinyl chloride, polybutadiene rubber, neodymium butadiene rubber, polypropylene, polyethylene terephthalate and polyethylene.

In accordance with one embodiment of the present disclosure, the polymer is polyvinyl chloride.

The predetermined pressure obtained by introducing the chlorine gas in the reactor is in the range of 0.5 to 2 bar.

The first predetermined temperature is less than the softening temperature of the polymer, typically in the range of 50° C. to 60° C.

The second predetermined temperature is above the softening temperature of the polymer, typically in the range of 70 to 100° C.

The wavelength of the radiation used for irradiating polymer is in the range of 250 to 550 nm. Typically, visible light is used for irradiating polymer, however, if needed UV light can also be used.

The intensity of the radiation used for irradiating polymer is in the range of 3 watt/Kg PVC to 10 watt/Kg PVC, Typically 4 watt/Kg PVC.

The steps of gradually increasing the temperature and gradually reducing the intensity of radiation are carried out over a time period in the range of 1 hour to 8 hours.

Typically, the photo-irradiated chlorination is performed for a time period in the range of 2 hours to 4 hours, and thermal process for chlorination of polyvinyl chloride is performed for 2 hours to 4 hours.

The initiation of chlorination reaction is driven by homolytic fission of Cl—Cl bond of the chlorine molecule by irradiating the reaction mixture comprising polymer powder, water and chlorine gas, which gives rise to chlorine radicals.

During chlorination, hydrogen of C—H in the polymer is replaced by chlorine. The aqueous chlorination of polyvinyl chloride (PVC) particles using chlorine gas is a three phase (Gas-Liquid-Solid) system. The surface chlorination of PVC particles occurs in the first phase, but the chlorination inside the pores of the PVC particles is also desirable for high chlorination yield as well as the uniformity in chlorination. Thus, diffusion of chlorine inside the pores of PVC and penetration of radiation or light is essential. Though diffusion of chlorine gas occurs inside the pores but the penetration of light inside the pores is poor. The poor penetration of light inside the pores of PVC obstructs the formation of the chlorine radicals inside the pores and so the chlorination. If the chlorine radical forms in solution external to the particle, due to short life time it recombines with another radical by the time it diffuses inside the pore. However, raising the reaction temperature also creates chlorine radicals inside the pores thereby chlorinating the polymer uniformly.

The process of the present disclosure employ gradual decrease of radiation intensity and gradual increase in reaction temperature, letting the chlorine radicals formed in the pores to react and chlorinate the polymer, thereby maximizing the utilization of chlorine.

The reduced exposure of radiation onto the polymer during the process of the chlorination in accordance with the present disclosure results in improved thermal stability, color of the polymer, inherent viscosity and the mechanical properties of the polymer.

The chlorinated polymer obtained by the process of the present disclosure is characterized by inherent viscosity in the range of 0.1 to 0.2 dL/g, and the intrinsic viscosity in the range of 0.8 to 0.82 dL/g.

The thermal stability, the intrinsic viscosity, and the whiteness index of the chlorinated polyvinyl chloride obtained using the process of the present disclosure were higher than that of the chlorinated polyvinyl chlode obtained using photo-irradiated process of chlorination.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

Experiment 1: Chlorination of Polyvinyl Chloride

A reaction vessel equipped with radiation source (kept inside the vessel) was charged with 630 g of polyvinyl chloride powder having porosity of 0.23 mL/g and 4000 mL of water. Next, chlorine gas was introduced in the reaction vessel till the pressure is increased to 1 atm to obtain a reaction mixture. The reaction mixture was further stirred to obtain a slurry. The slurry was irradiated using a radiation of 450 nm wavelength and intensity 4 watt per Kg PVC at 70° C. for 4 hours. The intensity of the radiation was reduced to zero while increasing the temperature of the slurry to 95° C., over the time period of 4 hours. The slurry was stirred for 4 hours to obtain chlorinated polyvinyl chloride (CPVC). The chlorinated PVC was recovered by filtration.

TABLE 1

Combination of reaction parameters, intensity and temperature, maintained during experiment 1.

| Reaction time (hour) ($T_{initial}$-$T_{final}$) | Intensity of radiation (Electrical input/ Watt per Kg PVC) | Temperature (° C.) |
|---|---|---|
| 0-0.5 | 4 | 60 |
| 0.5-1 | 3 | 70 |
| 1-2 | 2 | 80 |
| 2-3 | 1 | 90 |
| 3-4 | 0 | 95 |
| 4- | 0 | 95 |

Progress of the reaction was monitored periodically by titrating proportional amount of the slurry against 0.1 N NaOH. The reaction was stopped at the titer value corresponding to 67% chlorination (by weight) of polyvinyl chloride PVC by switching off the radiation and temperature. Next, nitrogen was purged continuously for 1 hour to expel out residual chlorine from the slurry. The slurry was thereafter filtered and washed with water till neutral pH was attained to obtain a wet cake. The wet cake was dried under reduced pressure and finally at vacuum at 55° C. for 2 hours to obtain a dried solid. The dried solid was powdered and the powder was further neutralized by washing it with 0.0125 N Ca(OH)$_2$ at 10 mL/g of CPVC for 10 minutes. Neutralized powder was washed with demineralized water to obtain chlorinated polyvinyl chloride (CPVC), which was finally dried at 70° C. for 3 hours.

Chlorinated polyvinyl chloride was analyzed to determined % chlorine content (by weight) using the method as per reference: IS-15778-2007. Calculations were executed by using formula: % chlorine in CPVC=[102.9−46.2(A/B)] where A=weight of PVC in gram, B=weight of CPVC obtained in gram. The chorine present in A gram PVC was considered 0.567 gram. The result was obtained within ±0.5%. The thermal stability (sec) of CPVC was measured by conductivity meter using PVC thermomat (Metrohm 895), as per DIN53381, ISO 182-3 and the results are provided Table 2.

Color values were obtained as per CIE Lab values from which whiteness Index and yellowness Index were determined and the results are provided Table 2.

Experiment 2: Comparative Experiment Using Photo Dissociation of Chlorine

A reaction vessel was charged with 630 g of polyvinyl chloride powder and 4000 mL of water. Chlorine gas was introduced in the reaction vessel till the pressure is increased to 1 atm to obtain a reaction mixture. The reaction mixture was further stirred to obtain a slurry. The slurry was irradiated under stirring using radiation of 450 nm wavelength, at a temperature of 70° C. to obtain chlorinated polyvinyl chloride. The chlorinated PVC was recovered by filtration.

The comparative results of experiment 1 and experiment 2 are provided Table 2.

TABLE 2

Comparision of properties of CPVC obtained in experiment 1 with CPCV of experiment 2

| Exp. | Reaction Time (h:min) | Intrinsic viscosity | Thermal stability (TSC) | Whiteness Index | Yellowness index | % extent of Clorination (by wt) |
|---|---|---|---|---|---|---|
| 1 | 4:00 | 0.82 | 480 | 86.77 | 3.10 | 67.23 |
| 2 | 5:00 | 0.79 | 368 | 81.43 | 5.00 | 67.20 |

From Table 2, it is evident that chlorinated polyvinyl chloride obtained at 4 hours of experiment 1 posses higher thermal stability as compared to chlorinated polyvinyl chloride at 5 hours of experiment 2, for equivalent % chlorinated polyvinyl chloride. Further, chlorinated polyvinyl chloride obtained at 4 hours of experiment 1 possess higher whiteness index (86.77) and intrinsic viscosity (0.82) as compared to polyvinyl chloride having the whiteness index of 81.43 and intrinsic viscosity of 0.79 for equivalent % chlorinated polyvinyl chloride.

Technical Advancements

The present disclosure described herein above has several technical advantages including, but not limited to, the realization of a process for chlorination of a polymer that is economic and efficient chlorination of polymers; that includes minimum use of light and chlorine utilization for getting maximum chlorination yield; and wherein chlorinated polyvinyl chloride obtained by this process exhibit improved properties viz, thermal stability, color, inherent viscosity and mechanical properties.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for chlorinating a polymer in an aqueous medium, said process comprising the following steps:
   charging a closed vessel with polymer powder and water to obtain a suspension;
   introducing chlorine gas into said closed vessel containing said suspension till a pressure in the range of 0.5 to 2 bar is attained to obtain a reaction mixture;
   stirring said reaction mixture to obtain a slurry;
   dissociating the chlorine molecules into chlorine radicals in two stages:
      dissociating a first portion of the chlorine molecules by irradiating said slurry with radiation having a predetermined intensity and wavelength at a first predetermined temperature between 50 degrees C. and 60 degrees C.; and
      further dissociating a second portion of the chlorine molecules, by gradually increasing the temperature of said slurry from said first predetermined temperature to a second predetermined temperature between 70 degrees C. and 100 degrees C., thereby thermally dissociating the chlorine molecules, into chlorine radicals, while gradually reducing the intensity of the radiation to zero;

allowing said dissociated chlorine radicals to react with said polymer to obtain a mixture comprising the chlorinated polymer; and recovering said chlorinated polymer, wherein said process is carried out in the absence of a swelling agent, a dispersing agent and an initiator.

2. The process as claimed in claim 1, wherein said polymer is at least one selected from the group consisting of polyvinyl chloride, polybutadiene rubber, neodymium butadiene rubber, polypropylene, polyethylene terephthalate and polyethylene.

3. The process as claimed in claim 1, wherein the wavelength of said radiation is in the range of 250 to 550 nm.

4. The process as claimed in claim 1, wherein the intensity of said radiation is in the range of 3 watt/Kg PVC to 10 watt/Kg PVC.

5. The process as claimed in claim 1, wherein, the steps of gradually increasing the temperature and gradually reducing the intensity of radiation are carried out over a time period in the range of 1 hour to 8 hours.

6. The process as claimed in claim 1, wherein said chlorinated polymer is characterized in that the inherent viscosity is in the range of 0.1 to 0.2 dL/g, and the intrinsic viscosity is in the range of 0.8-9 to 0.82 dL/g.

* * * * *